United States Patent Office 3,590,064
Patented June 29, 1971

3,590,064
PROCESS FOR PREPARING CYCLOSILOXANES
Charles W. Lacefield, c/o Dow Corning Corp.,
Midland, Mich. 48640
No Drawing. Filed July 23, 1969, Ser. No. 844,165
Int. Cl. C07f 7/08
U.S. Cl. 260—448.2E          13 Claims

ABSTRACT OF THE DISCLOSURE

A process for preparing cyclosiloxanes having at least three silicon atoms which involves the reaction of a halogen endblocked linear polysiloxane with at least a stoichiometric amount of an alkali metal carbonate salt in the presence of a suitable polar solvent. The reaction is exothermic and is preferably conducted at room temperature.

---

This invention relates to a method for preparing cyclosiloxanes.

The cyclosiloxanes defined herein can be ultimately polymerized to polysiloxanes which can be employed as elastomers, lubricants and for other uses well known to the art. In addition, certain of the cyclosiloxanes so prepared have been found to possess biological activity which is particularly useful in altering certain physiological functions in mammals.

The present invention relates to a method for preparing cyclosiloxanes of the formula

in which
R is selected from the group consisting of an alkyl radical of from 1 to 6 carbon atoms inclusive, a halogenated alkyl radical of from 1 to 6 carbon atoms inclusive, an alkenyl radical of from 2 to 6 carbon atoms inclusive, a halogen atom selected from the group consisting of a chlorine atom, a bromine atom, and an iodine atom, a phenyl radical, a hydrogen atom, and a 3,3,3-trifluoropropyl radical and z is an integer of at least 3, comprising
(A) contacting
(1) a polysiloxane of the formula

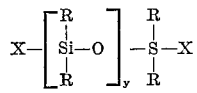

in which
R is as above defined,
y is an integer of at least 2, and
X is a halogen atom selected from the group consisting of a chlorine atom, a bromine atom, and an iodine atom, with
(2) at least a stoichiometric amount of an alkali metal cabonate salt, in the presence of
(3) a polar solvent, thereafter
(B) recovering the cyclosiloxane.

As noted above, R can be an alkyl radical of from 1 to 6 carbon atoms inclusive such as the methyl, ethyl, propyl, isopropyl, butyl, t-butyl, amyl, and the hexyl radical. The alkyl radical may also be halogenated, i.e., with the chlorine, bromine, or iodine atom.

In addition, R can be an alkenyl radical of from 2 to 6 carbon atoms inclusive such as the vinyl, allyl, methallyl, $CH_3CH_2CH_2CH=CH-$, and the $CH_3CH_2CH_2CH_2CH=CH-$ radical.

R can also be a halogen atom (i.e., the chlorine, bromine, or iodine atom), a phenyl radical, a hydrogen atom, or a 3,3,3-trifluoropropyl radical.

As noted above, z has a valve of at least 3, and X is a halogen atom selected from the group consisting of the chlorine, bromine, or iodine atom.

By the term "contacting," it is merely meant that the ingredients (1), (2) and (3) may be physically mixed or reacted in any feasible manner. For example, one may physically mix the polysiloxane (1) and the alkali metal carbonate salt (2) and thereafter add the polar solvent. One may also add the individual ingredients in a suitable container or one may simply add the polysiloxane (1) to a mixture of the alkali metal carbonate salt (2) and the polar solvent (3). In any event, it should be apparent that the ingredients merely be contacted in any generally suitable fashion most convenient under the prevalent circumstances.

At least a stoichiometric amount or more of the alkali metal carbonate salt (2) may be used; however, to best effectuate the purposes of the present invention, it is preferred that amounts in excess of a stoichiometric amount of the alkali metal carbonate salt (2) be employed. It has been found that lesser amounts than those specified above result in extremely poor yields of the desired cyclosiloxanes.

Illustrative of the alkali metal carbonate salts which are suitable include $K_2CO_3$, $Na_2CO_3$, $Li_2CO_3$, $Cs_2CO_3$, $Rb_2CO_3$, and the like. However, due to its availability and because of its greater reactivity, $K_2CO_3$ is obviously preferred.

The polar solvent (3) may be any commercially available polar solvent such as dimethylformamide, dimethylsulfoxide, nitromethane, dimethyl derivatives of diethylene glycols, etc. For purposes of the present invention, acetonitrile is most preferred.

The amount of the polar solvent employed is not particularly critical, however, it is preferred that there be an equal volume or more of the polar solvent present based upon the polysiloxane (1), since lesser amounts tend to significantly reduce the yield of cyclosiloxanes which are obtained.

It is to be noted that the defined reaction is exothermic and hence, is preferably conducted at room temperature. More than moderate heating, e.g., 50° C. or more, tends to proportionately reduce the yield of the cyclosiloxanes and also tends to promote random redistribution as opposed to the desired selectivity required.

It is to be further noted that the prior art methods for preparing the cyclosiloxanes defined herein, e.g., limited hydrolysis or the use of metal oxides, suffer from certain significant disadvantages. That is, the use of metal oxides results in the formation of by-products which are soluble in the solvent and therefore, complex and costly subsequent steps are necessary if one is to isolate the cyclosiloxanes. If limited hydrolysis is employed, only certain organic substituents can be used because the product of hydrolysis will readily cleave these certain organic substituents, e.g., aromatic substituents, from the silicon atom. For this reason, the limited hydrolysis process can be used only to prepare a limited variety of cyclosiloxanes. In contrast, it has been unexpectedly found that alkali metal carbonate salts function as extremely excellent "selective cyclization reactants." The term "selective cyclization reactant" simply means that these carbonate salts have the unique ability to promote intramolecular condensation of the parent material to form corresponding cyclics while simultaneously avoiding the disadvantages in the prior art methods heretofore related. As noted, it has been found that $K_2CO_3$ performs under these conditions in a very efficient manner.

EXAMPLE 1

A 50 ml. Erlenmeyer flask was charged with 10.0 grams (0.072 mole) potassium carbonate ($K_2CO_3$) and 45.0 grams acetonitrile ($CH_3CN$). Five grams (0.036 mole) of 1,5-dichlorohexamethyltrisiloxane $$(Cl[(CH_3)_2SiO]_2(CH_3)_2SiCl)$$

was added to the potassium carbonate-acetonitrile mixture. The resultant reaction mixture was continuously agitated employing a magnetic stirrer assembly. After an elapsed time of four hours the decanted solution was neutral to alk-acid paper exposure. Gas liquid chromatography analysis (excluding the resolution for acetonitrile), revealed the following:

| Structure: | Area percent |
|---|---|
| $[(CH_3)_2SiO]_3$ (hexamethylcyclotrisiloxane) | 76 |
| $[(CH_3)SiO_2]_6$ (dodecamethylcyclohexasiloxane) | 24 |

These structures were confirmed by internal standards.

EXAMPLE 2

A three necked two liter flask equipped with an air driven stirrer and vertical condenser was charged with 41.4 grams (0.3 mole) potassium carbonate ($K_2CO_3$) and 750 grams acetonitrile ($CH_3CN$). Added to this potassium carbonate-acetonitrile mixture were 83.1 grams (0.145 mole) 1,13-dichlorotetradecylmethylheptasiloxane $(Cl[(CH_3)_2SiO]_6(CH_3)_2SiCl)$. The resultant reaction mixture was continuously agitated for 24 hours. After this time duration the decanted solution was neutral to alk-acid paper exposure. Gas liquid chromatography analysis, excluding the resolution for acetonitrile, revealed 93.1 area percent tetradecylmethylcycloheptasiloxane $[(CH_3)_2SiO]_7$. This assigned structure was confirmed by internal standard.

EXAMPLE 3

A 250 ml. Erlenmeyer flask was charged with 5.0 grams (0.036 mole) potassium carbonate ($K_2CO_3$) and 140.0 grams acetonitrile ($CH_3CN$). Added to this potassium carbonate-acetonitrile mixture were 7.7 grams (0.01 mole) 1,19-dichloroeicosamethyldecosiloxane $$(Cl[(CH_3)_2SiO]_9(CH_3)_2SiCl)$$

The resultant reaction mixture was continuously agitated employing a magnetic stirrer assembly. After an elapsed time of approximately 16 hours the decanted solution was neutral to alk-acid paper exposure. Gas liquid chromatography analysis, excluding the resolution for acetonitrile, revealed only one component, eicosamethylcyclodecasiloxane $[(CH_3)_2SiO]_{10}$.

EXAMPLE 4

A three necked three liter flask equipped with an air driven stirrer and vent tube packed with drierite was charged with 56.7 grams (0.41 mole) potassium carbonate ($K_2CO_3$) and 1250 grams acetonitrile ($CH_3CN$). Added to this potassium carbonate-acetonitrile mixture were 125.0 grams (0.37 mole) 3-phenyl-1,5-dichloropentamethyltrisiloxane

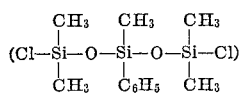

The resultant reaction mixture was continuously agitated and followed as a function of time by gas liquid chromatography. The formation of phenylpentamethylcyclotrisiloxane

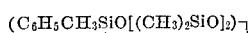

reached a maximum in area percent of 50% of the siloxane products formed. A distilled fraction of 15.1 grams was characterized as follows:

density at 25° C., 1.0146
refractive index at 25° C., 1.4536
molar refraction: exp. 75.88, theory 76.00
melting point, 6.5° C.

The infrared spectrum was in good accord with the structure for phenylpentamethylcyclotrisiloxane. Nuclear magnetic resonance spectrum afforded the following proton ratios:

Found: $C_6H_5CH_3*Si$, 3.1; $CH_3Si$, 6.0; $CH_3Si$, 5.9. Theory: $C_6H_5CH_3*Si$, 3.0; $CH_3Si$, 6.0; $CH_3Si$, 6.0.

Found: $C_6H_5Si$, 4.8; $CH_3Si$, 15.2. Theory: $C_6H_5Si$, 5.0; $CH_3Si$, 15.0.

EXAMPLE 5

A three necked two liter flask equipped with an air driven stirrer and vertical condenser was charged with 41.4 grams (0.3 mole) potassium carbonate and 900.0 grams acetonitrile ($CH_3CN$). Added to this potassium carbonate-acetonitrile mixture were 93.1 (0.147 mole) 1,13-dichlorophenyltridecylmethylheptasiloxane $$(Cl[(CH_3)_2SiO]_6C_6H_5CH_3SiCl)$$

The resultant reaction mixture was continuously agitated for 24 hours. After this time the decanted solution was neutral to alk-acid paper exposure. Gas liquid chromatography analysis, excluding the resolution for acetonitrile, revealed 52.3 area percent phenyltridecylmethylcycloheptasiloxane

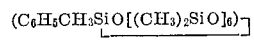

The following spectroscopy data recorded for a distilled fraction of the product further confirms the indicated structure. The infrared spectrum was in good accord with the structure for phenyltridecylmethylcycloheptasiloxane. Nuclear magnetic resonance spectrum afforded the following proton ratios:

Found: $C_6H_5Si$, 5.0; $CH_3Si$, 39.0. Theory: $C_6H_5Si$, 5.0; $CH_3Si$, 39.0.

Found: $CH_3Si$, 2.9; $(CH_3)_2Si$, 36.1. Theory: $CH_3Si$, 3.0; $(CH_3)_2Si$, 36.0.

EXAMPLE 6

A three necked five liter flask equipped with an air driven stirrer and vertical condenser was charged with 250 grams (1.81 moles) potassium carbonate ($K_2CO_3$) and 3037 grams acetonitrile ($CH_3CN$). Added to this potassium carbonate-acetonitrile mixture were 303.7 grams (0.756 mole) 1,5-diphenyl-1,5-dichlorotetramethyltrisiloxane

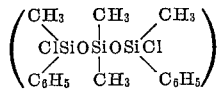

The resultant reaction mixture was continuously agitated until a sample of the decanted solution was neutral to alk-acid paper exposure. Gas liquid chromatography analysis, excluding the resolution for acetontrile, revealed 89 area percent 1,5-diphenyltetramethylcyclotrisiloxane

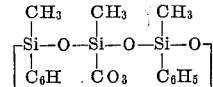

A distilled fraction of 62.4 grams was characterized as follows:

density at 25° C., 1.0714
refractive index at 25° C., 1.5027
molar refraction: exp. 95.58, theory 95.90

The infrared spectrum was in good accord with the structure for a mixture of the cis and trans isomers of 1,5-

*Denotes methyl substitution on silicon containing phenyl.

diphenyltetramethylcyclotrisiloxane. Nuclear magnetic resonance spectrum afforded the following proton ratios:

Found: $C_6H_5Si$, 10.0; $CH_3Si$, 12.0. Theory: $C_6H_5Si$, 10.0; $CH_3Si$, 12.0.

EXAMPLE 7

A three necked three liter flask equipped with an air driven stirrer and vertical condenser was charged with 81.9 grams (0.593 mole) potassium carbonate ($K_2CO_3$) and 1980 grams $CH_3CN$. Added to this potassium carbonate-acetonitrile mixture were 220 grams (0.6 mole) 1,1,7-trichloroheptamethyltetrasiloxane

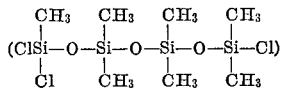

The extent of cyclization was followed as a function of time by gas liquid chromatography analysis. At complete disappearance of the 1,1,7-trichloroheptamethyltetrasiloxane 56.7 area percent chloroheptamethylcyclotetrasiloxane

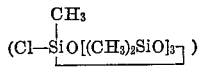

was observed by gas liquid chromatography analysis. A distilled fraction of the reaction product yielded the following characterization data:

percent chlorine: found 10.88%, theory 11.18%
density at 25° C., 1.0402
refractive index at 25° C., 1.4016
molar refraction: found 74.15, theory 74.36

The infrared spectrum was in good accord with the structure for chloroheptamethyltetrasiloxane. Nuclear magnetic resonance spectrum revealed the following methyl proton ratios:

Found: $CH_3Si$, 0.9; $(CH_3)_2Si$, 4.0; $(CH_3)_2Si$, 2.1. Theory: $CH_3Si$, 1.0; $(CH_3)_2Si$, 4.0; $(CH_3)_2Si$, 2.0.

EXAMPLE 8

Sixty-two and one-half grams (0.216 mole) of 1,5-dichloro-1-vinylpentamethyltrisiloxane was added portionwise over a 7-minute period to a rapidly stirred slurry of 32.9 grams (0.238 mole) anhydrous $K_2CO_3$ in 1095 ml. (90% by weight) $CH_3CN$ contained in a 3000 ml. three-necked flask. The extent of reaction was followed by gas liquid chromatography analysis. A gas liquid chromatogram recorded after 107 minutes reaction time revealed that only a trace of the 1,5-dichloro-1-vinylpentamethyltrisiloxane remained and that the cyclotrisiloxane

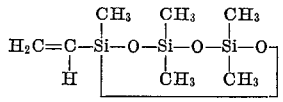

constituted about 82 area percent of the volatiles excluding $CH_3CN$. This mixture was immediately taken up in about 1000 ml. of cyclohexane after first decanting it from the solids, $K_2CO_3$ and KCl. After several washings with dilute ammonium hydroxide (.1 N) and then distilled water, the cyclohexane solution became neutral to alkacid paper and was dried with about 50 grams of $Na_2SO_4$, filtered and vacuum stripped (approximately 25° C. and 50 mm. Hg) to remove volatiles. This charge (41.6 grams) was then fractionated at reduced pressure in a Todd assembly. Distillation provided 18 grams (0.078 mole) of vinylpentamethylcyclotrisiloxane

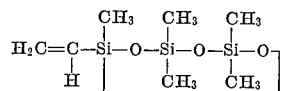

B.P. 57° C. at 19 mm. Hg, $n_D^{25}$ 1.3965, $d^{25}$ 0.9406 gram/ml., a distilled yield of 36%.

Analysis.—Calcd. for $C_7H_{18}Si_3O_3$ (percent): $MR_D$, 60.27. Found (percent): $MR_D$, 59.96.

Gas liquid chromatography analysis of a sample taken from a constant boiling fraction indicated it to be one component. The infrared spectrum of this distilled product was recorded in $CCl_4$ and $CS_2$ and showed bands attributable to Si—O—Si (1015 cm.$^{-1}$), $SiCH_3$, Si—CH=$CH_2$ (1597 cm.$^{-1}$) and C—H indicating a copolymer vinylmethyl-dimethyl cyclotrisiloxane structure. Mass spectrometry confirmed the substance as vinylpentamethylcyclotrisiloxane and the mass spectrum showed its first peak at m./e. 234 that has a $Si_3O_3C_7H_{18}$ composition. The substance was further identified as vinylpentamethylcyclotrisiloxane on the basis of its proton nuclear magnetic resonance spectrum recorded in $CCl_4$. The spectrum showed a multiplet at 4.0, 4.2 p.p.m. characteristic of vinyl protons. The spectrum also showed two sharp singlets at 9.822 and 9.862 p.p.m. due to the methyl protons of $CH_2$=$CHSiCH_3$ and $Si(CH_3)_2$, respectively. The ratio of $SiCH$=$CH_2$ protons to $SiCH_3$ (total) protons was 2.8 to 15.2.

EXAMPLE 9

One-hundred eight grams (0.263 mole) of 1,9-dichloro-1-hydrogennonamethylpentasiloxane was added portionwise over a 20-minute period to a rapidly stirred slurry of 39.9 grams (0.289 mole) anhydrous $K_2CO_3$ in 1705 ml. (90% by weight) $CH_3CN$ contained in a 3000 ml. three-necked flask. A gas liquid chromatogram recorded 200 minutes reaction time revealed only a trace of the starting chlorosiloxane and that the cyclopentasiloxane

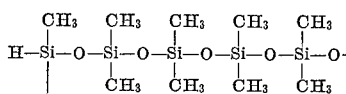

constituted about 74 area percent of the volatiles excluding $CH_3CN$. The mixture was immediately taken up in about 500 ml. hexane after first filtering away from the solids. After several washings with distilled water the hexane solution became neutral to alkacid paper and was dried with anhydrous $Na_2SO_4$, filtered, and vacuum stripped (25° C. and 20 mm. Hg) to remove volatiles. This charge (78.3 grams) was then fractionated at reduced pressure in a Todd assembly. Distillation gave 53 grams (0.149 mole) of nonamethylcyclopentasiloxane, B.P. 74° C. at 6 mm. Hg, $n_D^{25}$ 1.3945, $d^{25}$ 0.9605 gram/ml., a distilled yield of 57%.

Analysis.—Calcd. for $C_9H_{28}Si_5O_5$ (percent): $MR_D$, 89.10. Found (percent): $MR_D$, 88.95.

Gas liquid chromatography analysis of a sample taken from a constant boiling fraction indicated it to be one component. The infrared spectrum of this distilled fraction recorded in $CCl_4$ and $CS_2$ showed bands attributable to Si—O, Si—O—Si, $SiCH_3$, C—H, and Si—H (2155 cm.$^{-1}$) indicating a cyclopentasiloxane containing Si—H. A mass spectrum of this sample confirms the substance as nonamethylcyclopentasiloxane and showed a peak at m./e. 355 for loss of a hydrogen and at m./e. 341 for loss of a methyl. The substance was further identified as the structure on the basis of its H' N.M.R. spectrum recorded in $CCl_4$. The spectrum showed a multiplet at about 5.2 to 5.4 p.p.m. Characteristic of the Si—H protons in the H—Si—$CH_3$ moiety. The spectrum showed singlets (not well resolved) at 9.930, 9.909, 9.873 p.p.m. due to the $Si(CH_3)_2$ and H—$SiCH_3$ methyl protons. The ratio of Si—H protons to Si—$CH_3$ (total) protons was 1.0 to 27.0.

EXAMPLE 10

Thirty-six and seven-tenths grams (0.10 mole) of 1,3-dichloro - 1,3 - trifluoropropyldimethyldisiloxane and 20.3 grams (0.10 mole) 1,3-dichlorotetramethyldisiloxane were combined and added portionwise with an addition funnel over a 5-minute period to a rapidly stirred slurry of 41.4 grams (0.30 mole) anhydrous $K_2CO_3$ and 513 grams (90% by weight) $CH_3CN$ contained in a 2000 ml. three-necked flask. Gas liquid chromatography was used to follow the extent of reaction. A gas liquid chromatogram recorded after 4 hours reaction time revealed that the starting 1,3-dichlorodisiloxanes had been reacted and the following area percentages of cyclotetrasiloxanes indicated (excluding CH₃CN): [(CH₃)₂SiO]₄, 17.5%;

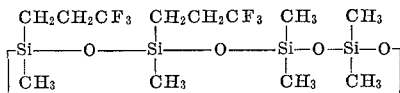

43.5%; and

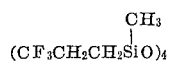

34.8%. The reaction products, [(CH₃)₂SiO]₄ and

were identified by gas liquid chromatography spiking methods with internal standards and the copolymer cyclic was ascertained by logical chemistry and its gas liquid chromatography retention time. This mixture was immediately taken up in cyclohexane (600 ml.) after first decanting it from the solids, K₂CO₃ and KCl. After several washings with distilled water, the cyclohexane solution became neutral to alkacid paper and was dried with about fifty grams of anhydrous Na₂SO₄, filtered, and vacuum stripped to remove cyclohexane (25° C. at 50 mm. Hg). This charge (46.8 grams) was then fractionated at reduced pressure in a Spinning Band Assembly.

EXAMPLE 11

When the following polysiloxanes were substituted for the polysiloxane of Example 6 and the preparation was as described therein, the indicated cyclics were obtained

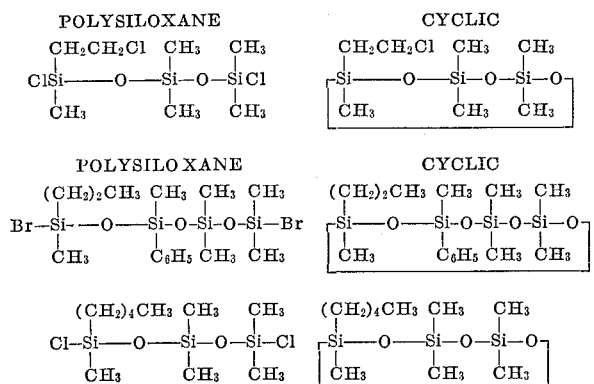

EXAMPLE 12

When Na₂CO₃, Li₂CO₃, Cs₂CO₃ or Rb₂CO₃ was substituted for K₂CO₃ and when dimethylformamide, dimethylsulfoxide, no nitromethane was substituted for acetonitrile of Example 1, equivalent results were obtained.

That which is claimed is:

1. A method for preparing cyclosiloxanes of the formula

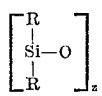

in which
R is selected from the group consisting of an alkyl radical of from 1 to 6 carbon atoms inclusive, a halogenated alkyl radical of from 1 to 6 carbon atoms inclusive, an alkenyl radical of from 2 to 6 carbon atoms inclusive, a halogen atom selected from the group consisting of a chlorine atom, a bromine atom, and an iodine atom, a phenyl radical, a hydrogen atom and a 3,3,3-trifluoropropyl radical and z is an integer of at least 3, comprising
(A) contacting
(1) a polysiloxane of the formula

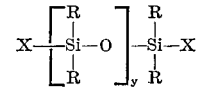

in which
R is as above defined,
y is an integer of at least 2, and
X is a halogen atom selected from the group consisting of a chlorine atom, a bromine atom, and an iodine atom, with
(2) at least a stoichiometric amount of an alkali metal carbonate salt, in the presence of
(3) a polar solvent, thereafter
(B) recovering the cyclosiloxane.

2. The method as recited in claim 1 in which the alkali metal carbonate salt (2) is K₂CO₃.

3. The method as recited in claim 2 in which the polar solvent (3) is acetonitrile.

4. The method as recited in claim 3 in which the polysiloxane (1) is of the formula

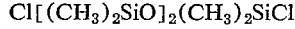

5. The method as recited in claim 3 in which the polysiloxane (1) is of the formula

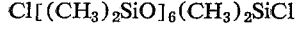

6. The method as recited in claim 3 in which the polysiloxane (1) is of the formula

7. The method as recited in claim 3 in which the polysiloxane (1) is of the formula

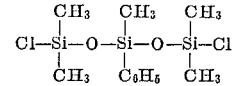

8. The method as recited in claim 3 in which the polysiloxane (1) is of the formula

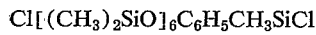

9. The method as recited in claim 3 in which the polysiloxane (1) is of the formula

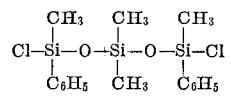

10. The method as recited in claim 3 in which the polysiloxane (1) is of the formula

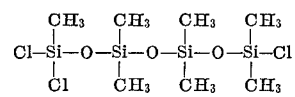

11. The method as recited in claim 3 in which the polysiloxane (1) is of the formula

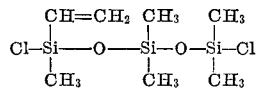

12. The method as recited in claim 3 in which the polysiloxane (1) is of the formula
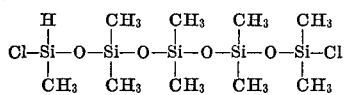
13. The method as recited in claim 3 in which the polysiloxane (1) is of the formula
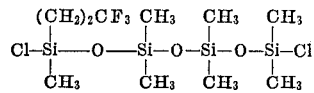
References Cited
UNITED STATES PATENTS
3,484,469  12/1969  Guinet et al. ____ 260—448.2E
JAMES E. POER, Primary Examiner
P. F. SHAVER, Assistant Examiner
U.S. Cl. X.R.
260—448.2R